UNITED STATES PATENT OFFICE.

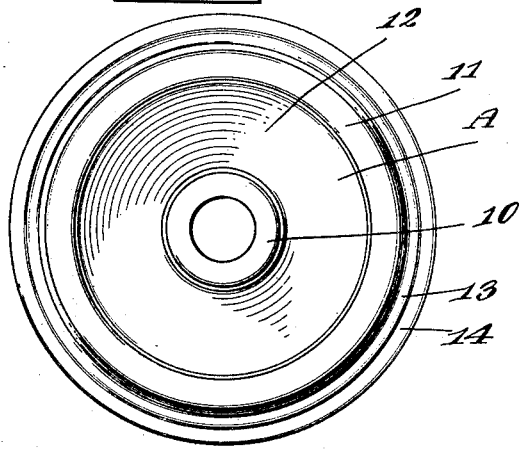
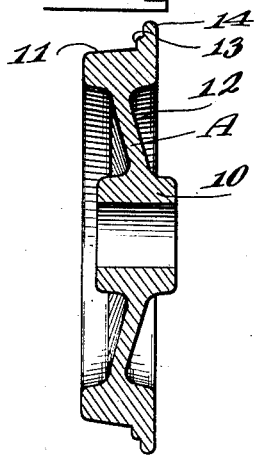
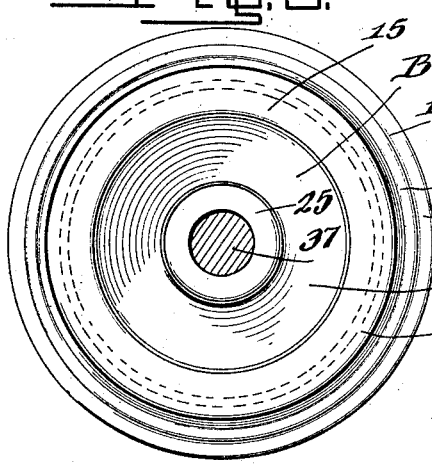
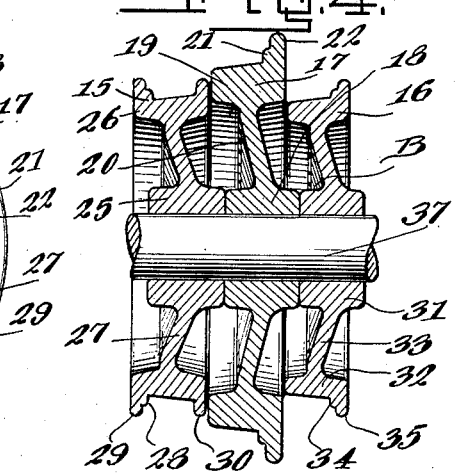
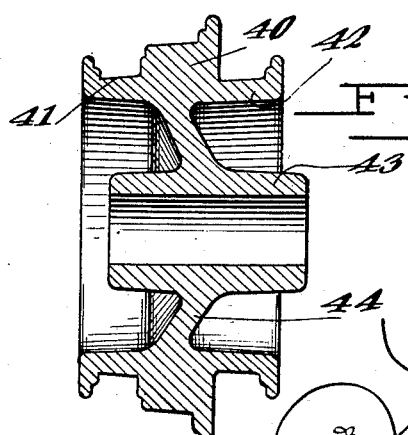

EUGENE G. MITCHELL, OF RED LEVEL, ALABAMA.

CAR-WHEEL.

1,379,121.	Specification of Letters Patent.	Patented May 24, 1921.

Application filed October 28, 1920. Serial No. 420,173.

*To all whom it may concern:*

Be it known that I, EUGENE G. MITCHELL, a citizen of the United States, residing at Red Level, in the county of Covington and State of Alabama, have invented certain new and useful Improvements in Car-Wheels, of which the following is a specification.

This invention relates to wheels for railroad rolling stock and the like, and the primary object of the invention is to provide an improved railroad car wheel, which is so constructed that the likelihood of a car equipped with the wheels jumping the track is reduced to a minimum, thereby eliminating the possibility of wrecks, derailed cars and the like.

Another object of the invention is to provide a car wheel embodying a relatively wide tread, so that if the car tracks are spread from any cause, the car wheels will still have a bearing face for engaging the same, the car wheels also being provided with an additional guard flange of relatively large diameter for engaging the car tracks in instances of this character.

A further object of the invention is to provide an improved car wheel for engaging a track embodying a central body or wheel for engaging the track under ordinary conditions and side guard bodies or wheels for engaging the car tracks in cases of emergency, such as when the central bodies or wheels jump the track, the central body or wheel having a relatively wider tread than the side bodies or wheels and a relatively larger diameter.

A still further object of the invention is to provide an improved railroad car wheel of the above character, which is durable and efficient in use, one that is simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawing, forming a part of this specification, in which drawing:

Figure 1 is a side elevation of a railroad car wheel constructed in accordance with the invention.

Fig. 2 is a diametric section through the same.

Fig. 3 is a side elevation of a modified form of car wheel in which the side guard wheels or bodies are utilized.

Fig. 4 is a diametric section through the same, and

Fig. 5 is a further modified type of wheel, in which the side bodies or wheels are cast integral with the central body or wheel.

Referring to the drawings in detail, wherein similar reference characters designate corresponding parts throughout the several views, the letter A indicates the improved car wheel, which includes the hub 10, the tread 11, and the connecting disk 12.

The car wheel A may be shaped and formed in any preferred manner, and if so desired, the tread may be formed in the nature of a tire and shrunk on the wheel so as to permit the improved wheel to be used as a driver for locomotives. The tread 11 is formed relatively wider than is the usual tread for car wheels, so that in cases where the rails have spread, the wheels will still have a bearing surface for engagement with the same. One edge of the tread 11 at the periphery thereof is provided with an outwardly extending guard flange 13, which has a diameter substantially equal to the usual guard flanges formed on car wheels. This flange 13 is adapted to engage the car rails under ordinary circumstances. A second guard flange 14 is cast on the wheel and extends outwardly beyond the first guard flange 13 and is provided, so as to decrease the likelihood of a car wheel leaving a car track. This flange 14 is also adapted to engage the railroad rails when the same are spread, so as to hold the car on the track.

In Figs. 3 and 4 is illustrated a car wheel B in which side bodies or wheels 15 and 16 are mounted on the opposite sides of a central body or car wheel 17. The central body or car wheel 17 is constructed exactly like the car wheel described in Figs. 1 and 2, and includes the hub 18, the rim 19 and the connecting disk 20. The rim in this form is also provided with the relatively small guard flange 21 and the relatively large guard flange 22 and the tread portion of the rim is formed relatively wide for the purpose hereinbefore explained. The wheel or side body 15 includes the hub 25, the rim 26 and the connecting disk 27. The periphery of the rim has its outer edge provided with a guard flange 28 and a guard flange 29, which is formed with a relatively larger diameter than the guard flange 28. The periphery of the rim 26 at the inner edge thereof is also provided with a guard flange 30. The side guard body or wheel 16 includes the hub 31, the rim 32 and the connecting disk 33. The rim 32 lies substantially in the same plane as the rim 26 of the wheel 15. The width of the tread portions of the rims 32 and 26 are substantially narrower than the rim 19 of the central body or rim 17. The outer edge of the periphery of the rim 32 is provided with a guard flange 34 and a relatively large guard flange 35, similar to the wheel 15. All of the hubs of the wheels or bodies 15, 16 and 17 are in direct alinement and are mounted upon the usual car axle designated by the numeral 37.

In Fig. 5 is illustrated a wheel similar to the wheel shown in Figs. 3 and 4 with the exception that the main central wheel 40 and the side guard wheels 41 and 42 are cast integral and are provided with a common relatively long hub 43. The hub 43 is connected with the central wheel or body 40 by means of the relatively thick disk 44. This wheel operates in the same manner as the wheel described in Figs. 3 and 4, and it can be seen that if the central wheels or bodies 17 or 40 leave the rails, that either one of the side wheels or bodies 16 or 41 or 42 will engage the rails.

Inasmuch as the form shown in Fig. 5 is similar to the form shown in Figs. 3 and 4 a more specific description of the same is deemed superfluous.

From the foregoing description, it can be seen that an exceptionally simple and durable car wheel has been provided, which will effectively prevent a car equipped with the wheels from jumping the track, and which will prevent wrecks caused by the spreading of the car rails.

Changes in details may be made without departing from the spirit or scope of this invention; but,

I claim:

1. A car wheel comprising a hub, a rim, a pair of guard flanges formed on the rim, and side wheels arranged on opposite sides of the first mentioned wheel.

2. A car wheel comprising a relatively wide rim having a guard flange of relatively small diameter, and a guard flange of relatively large diameter formed thereon adjacent to one edge, and side wheels of relatively small diameter arranged on opposite sides of the first mentioned wheel.

3. A car wheel comprising a central body having a relatively wide rim, and a pair of abutting guard flanges formed on one edge of the rim, and a guard member arranged on each side of the first mentioned wheel, each of said guard members having inner and outer guard flanges formed on one edge of the same.

4. A car wheel comprising a central body and side bodies, the central body having a relatively larger diameter than the side bodies, and a tread of greater width than the side bodies, inner and outer guard flanges formed on the central body at one edge thereof, inner and outer guard flanges formed on the outer side edges of each of the guard bodies, and an inner single guard flange formed on the opposite edge of one of the side bodies.

EUGENE G. MITCHELL.